United States Patent [19]

Brabb et al.

[11] Patent Number: 4,588,133
[45] Date of Patent: May 13, 1986

[54] COMBINED CHUTE AND VARIABLE RATE CONTROL ASSEMBLY FOR A BROADCAST SPREADER

[75] Inventors: James D. Brabb, London; Dennis L. Simpson, Marysville, both of Ohio

[73] Assignee: White Castle System, Inc., Columbus, Ohio

[21] Appl. No.: 631,886

[22] Filed: Jul. 18, 1984

[51] Int. Cl.[4] ........................ B65D 47/28; A01C 17/00
[52] U.S. Cl. ........................................ 239/681; 239/687; 222/561
[58] Field of Search ............... 239/665, 681, 685, 687, 239/688; 222/561

[56] References Cited

U.S. PATENT DOCUMENTS

| | | | |
|---|---|---|---|
| 1,751,928 | 3/1930 | Lachner | 239/687 |
| 2,670,108 | 2/1954 | Skogstad et al. | 222/561 |
| 3,383,055 | 5/1968 | Speicher | 239/687 |
| 3,523,648 | 8/1970 | Garber | 239/687 X |
| 3,738,546 | 6/1973 | Speicher | 239/687 X |
| 4,487,370 | 12/1984 | Speicher | 239/687 |

Primary Examiner—Joseph F. Peters, Jr.
Assistant Examiner—Mary Beth O. Jones
Attorney, Agent, or Firm—Rambo & Rambo

[57] ABSTRACT

Improved control over the distribution pattern and the amount of fertilizer, grass seed or the like dispensed by a broadcast spreader is accomplished by mounting a variable rate control device in a material directing chute secured below a basin wall of a hopper. A web or ramp portion of the chute is spaced below a discharge port in the hopper, and the rate control device is rotatably mounted in a housing formed in the rear of the chute to engage a shutter that is slidably mounted under the discharge port.

1 Claim, 5 Drawing Figures

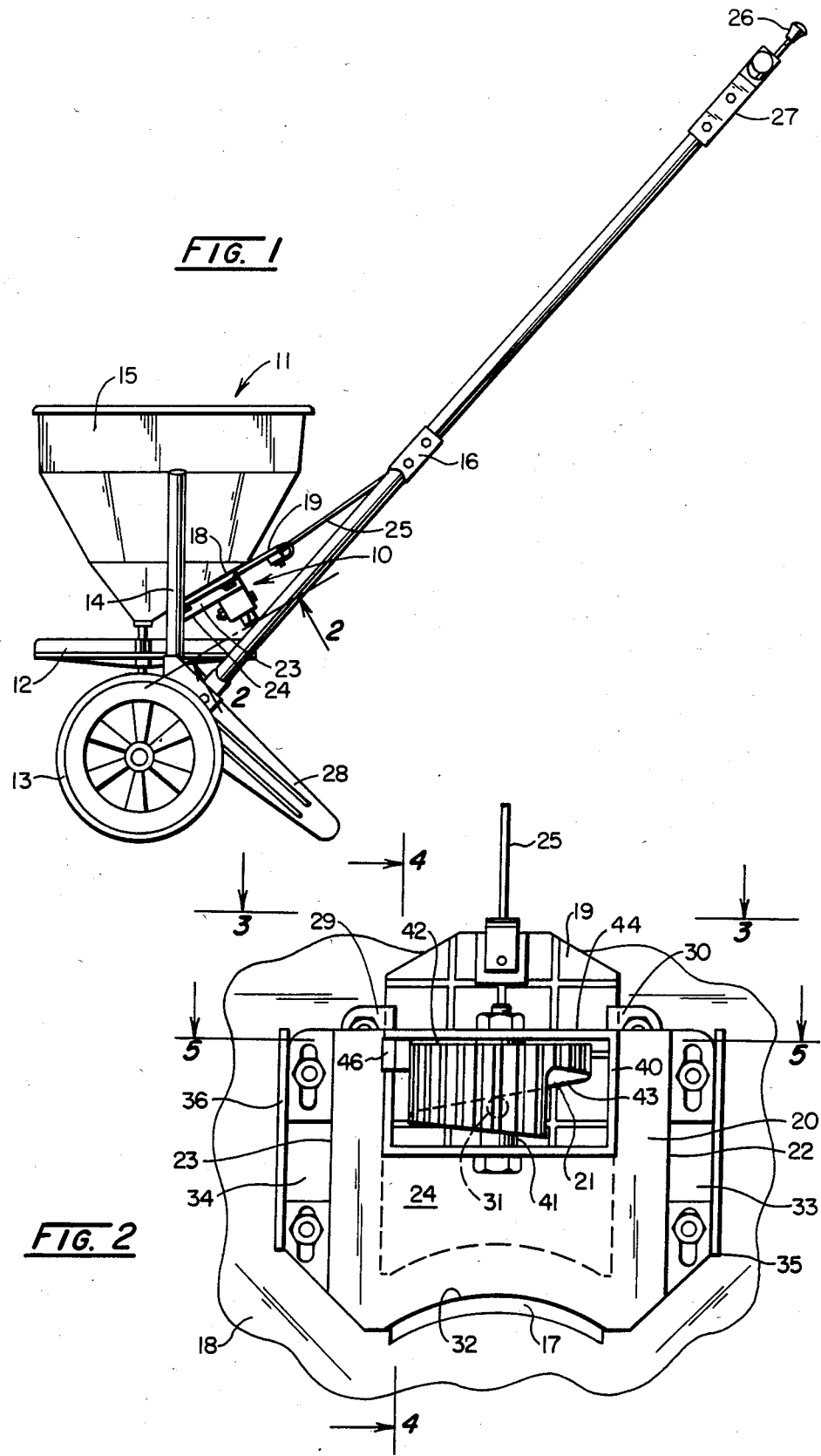

U.S. Patent   May 13, 1986   Sheet 2 of 2   4,588,133
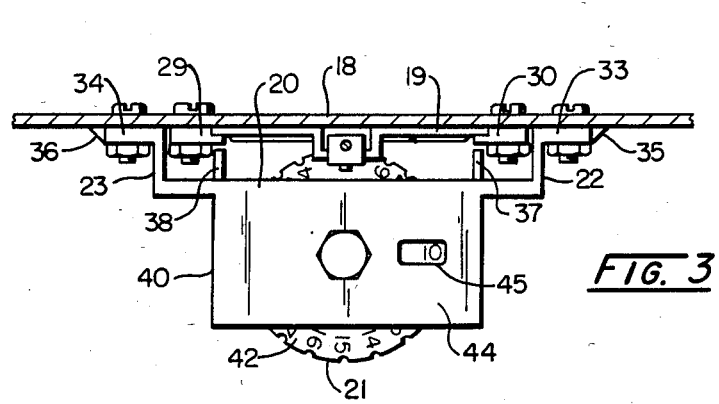
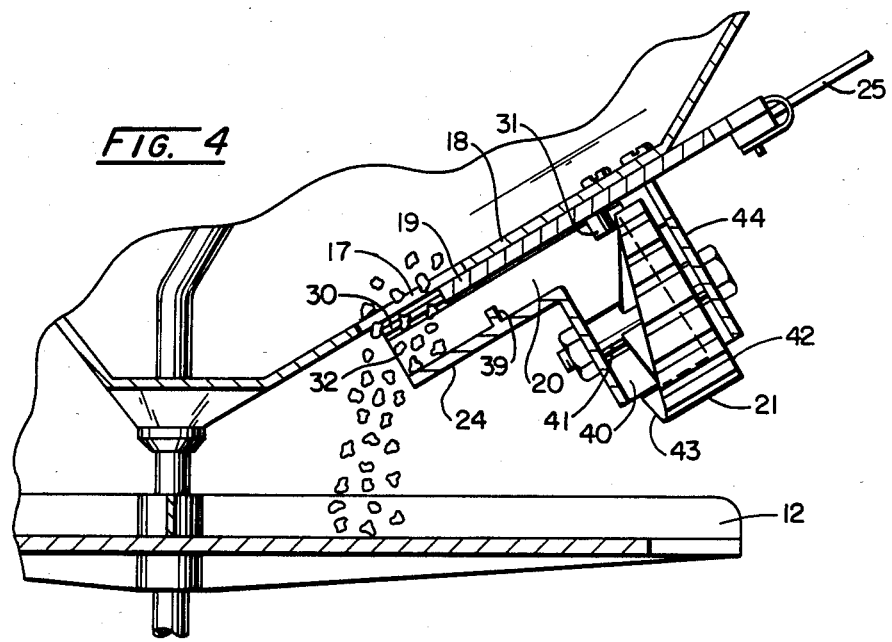
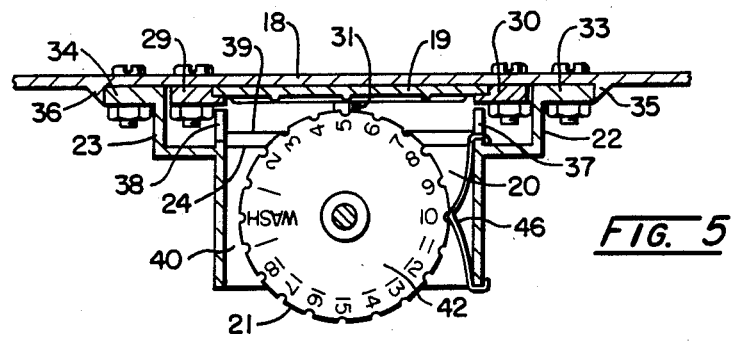

COMBINED CHUTE AND VARIABLE RATE CONTROL ASSEMBLY FOR A BROADCAST SPREADER

BACKGROUND OF THE INVENTION

The present invention relates to apparatus for spreading fertilizer, grass seed and other granular, pelletized, particulate or powdered material onto a surface, and more particularly to means for guiding and regulating the flow of material from the hopper to the rotary impeller of a broadcast spreader.

Most, if not all, broadcast spreaders, as opposed to gravity feed or drop-type spreaders, are provided with a rotary impeller or distribution plate mounted below the hopper to propel the granular, particulate or powdered material onto lawns or other surfaces. A discharge port permits the material to pass from the hopper onto the impeller, and a shutter is slidably or pivotally mounted under the discharge port to restrict the flow of material therethrough. A chute or funnel may be interposed between the hopper and the impeller to guide the fertilizer onto the proper area of the impeller. In this manner, an evenly distributed, forwardly projected, fan-like pattern of material flies off the rotating impeller.

An adjustable rate control mechanism is also typically provided on broadcast spreaders to change the quantity of material dispensed per unit area of lawn. By moving the setting on the rate control device, the operator permits a larger or smaller portion of the discharge port to be uncovered when the shutter is shifted away from a closed position relative thereto.

In the past, chute and rate control devices have been physically and/or functionally independent of one another and have been subject to various limitations caused, in part, by this separation. The closest prior art known to the inventors are U.S. Pat. Nos. 3,193,297 issued July 6, 1965 to Van der Lely et al; 3,383,055 issued May 14, 1968 to Speicher; and 3,856,211 issued Dec. 24, 1974 to Williams. The Van der Lely et al patent discloses a tubular, cylindrical chute extending between the hopper and the impeller. A rate control mechanism is mounted remotely on a portion of the frame and steering arm, and a control rod extends from the rate control mechanism to an annular shutter rotatably mounted on the outer surface of the chute. By mounting the shutter at the discharge end of the chute, there is an undesirable tendency for material to become lodged inside the chute. In addition, the complexity of the Van der Lely rate control increases its cost and maintenance requirements. U.S. Pat. No. 3,383,055 to Speicher discloses a chute mounted below the shutter to direct material falling freely from the discharge opening of the hopper onto the impeller. The Speicher chute is, however, completely separated from the rate control mechanism and is of no use in standardizing, protecting, or otherwise simplifying the rate control function. U.S. Pat. No. 3,856,211 to Williams discloses a spreader whose chute is an integral part of a container-holding platform employed in lieu of a hopper. A shutter and a rate control mechanism are mounted at the discharge end of the tapered chute, thereby increasing the chances of the chute becoming clogged with fertilizer or other material. In addition, the Williams spreader is limited to use with certain materials and containers, and the rate control has a very limited range of settings. In contrast to the forementioned prior art, a spreader constructed according to the present invention is provided with chute and rate control components that are functionally and physically interdependent. Accordingly, the present invention provides certain economies and capabilities, as explained more fully herein.

SUMMARY AND OBJECTS OF THE INVENTION

The present invention represents an improvement in a broadcast spreader used to distribute fertilizer, grass seed and the like. A broadcast spreader for which the present invention is adapted is equipped with, among other things, a hopper provided with a discharge port, a shutter disposed below the discharge port and in close proximity thereto for movement between a closed position and a number of opened positions, and an impeller spaced below the shutter. The improvement which is the subject of the present invention basically comprises a material-directing chute and a variable rate control device combined together to form a unitary subassembly or component. The chute is formed with a pair of laterally spaced apart legs secured to an outer surface of the basin wall of the hopper and with a web portion extending from one leg to the other in spaced relation to and between the shutter and the impeller. The variable rate control device is mounted on the chute for selective movement between a number of settings to engage the shutter and limit its opening movement.

A primary object of the present invention is to provide a component for a broadcast spreader that not only directs the fertilizer or other material onto an optimal area of the impeller, but also controls the material flow rate. A further object is to provide a flow regulation and guidance component in which material is unlikely to become clogged. Yet another object is to provide a component by which the material flow rate may be standardized at the factory. Still another object of the present invention is to provide a material guiding chute and a rate control device that are relatively durable, reliable, economical and simple to operate. These and other objects and advantages of the present invention may be more readily perceived and understood in light of the following drawings and description of the preferred embodiment.

BRIEF DESCRIPTION OF THE DRAWINGS

FIG. 1 is a side elevational view of a broadcast spreader provided with a combined chute and variable rate control assembly according to the present invention;

FIG. 2 is an enlarged, fragmentary bottom view taken along line 2—2 of FIG. 1 and illustrates particularly the preferred construction of and positional relationships between the hopper lower wall, the discharge port, the shutter, and the present assembly, FIG. 3 is a vertical sectional view taken along line 3—3 of FIG. 2 and illustrates particularly the rear wall of the chute and the symbol-displaying window formed therein;

FIG. 4 is a vertical sectional view taken along line 4—4 of FIG. 2 and illustrates particularly the shutter engaging the rate control device and a general pattern of material passing from the hopper to the impeller via the chute; and FIG. 5 is a vertical sectional view taken along line 5—5 of FIG. 2 and illustrates particularly the preferred resilient biasing means for holding the rate control at a desired setting.

DETAILED DESCRIPTION OF THE PREFERRED EMBODIMENT

As indicated in FIG. 1, an integrated chute and variable rate control assembly, generally designated 10 and in accord with the present invention, is mounted on a spreader 11 adapted to distribute granular, pelletized, particulate or pulverized material, such as grass seed or fertilizer, in a controlled manner over the ground. The spreader 11 is of the centrifugal broadcast type that is adapted to dispense the fluent material in an outwardly projecting, fan-like swath. Accordingly, it is provided with a rotary impeller or ejection plate 12 that is driven in a manner well known in the art by shafts and intermeshing gears (not shown) operatively connected to a pair of laterally spaced apart wheels 13. A framework 14 supports a hopper 15, and a steering assembly 16 extends from the framework. A discharge port 17 (FIGS. 2 & 4) is formed in a lower or basin wall 18 of the hopper. A shutter 19 is disposed in close proximity to and below the discharge port 17 for movement between a closed position and a plurality of opened positions.

As indicated in the drawings, the present invention 10 basically comprises an integrated material-directing chute 20 and a variable rate control device or regulator 21 mounted thereon. The chute or housing 20 is formed with a pair of laterally spaced apart legs 22 and 23 secured to an outer surface of the basin wall 18 of the hopper and with a material deflecting wall or web portion 24 extending from one leg 22 to the other leg 23 in spaced relation to and between the shutter 19 (FIG. 4) and the impeller 12. The variable rate control device 21 is mounted on the chute for selective movement between a plurality of settings to engage the shutter 19 and to limit the opening movement thereof.

The hopper is formed with four downwardly converging basin walls and with a relatively small bottom wall. The discharge port 17 is formed near the bottom of the rear basin wall 18, and the shutter 19 and chute 20 are mounted on the outer surface thereof. The upper sidewalls of the hopper provide additional material capacity. Preferably, the hopper 15, shutter 19, chute 20, rate control 21 and impeller 12 are molded from synthetic resin material, such as an impact resistant ABS plastic.

As further indicated in FIG. 1, the present invention 10 is suitable for use on a broadcast spreader adapted to be propelled across a lawn or other surface by the operator. Accordingly, the steering assembly 16 extends diagonally upwardly and rearwardly from the framework 14 to a suitable height for the operator to push the spreader in front of him or her. A control rod 25 is secured at one end to a rear ledge portion of the shutter 19 by a spring clip or other suitable fastener and extends through a portion of the steering assembly to a hand-operated shutter control 26, mounted in a handle 27 at the free end of the steering arm. The shutter control 26 and handle 27 may be constructed in a manner disclosed in our pending U.S. patent application, entitled Shutter Shifting Mechanism for a Material Spreader, Ser. No. 621,958 filed June 18, 1984, whereby the shutter is shifted between opened and closed positions by a spring-biased actuator and a catch mechanism. In addition, a pair of laterally spaced apart legs 28 may be provided to support the spreader in an upright position when it is not in use. As best indicated in FIGS. 2, 3 and 5, the shutter 19 is a substantially flat, generally rectangular structure mounted along opposite longitudinal edges in channels formed in a pair of laterally spaced apart guide rails 29 and 30 that are secured to the outer surface of the rear basin wall 18. The surface of the shutter opposite the basin wall is formed with a plurality of intersecting, reinforcing ribs and with a downwardly projecting stop or detent 31 (FIG. 4), both preferably integrally formed on the shutter.

The material-directing chute 20 is a platform-like structure that, as best indicated in FIG. 4, is open at its forward, material-expelling end 32. The legs 22 and 23 extend longitudinally from the front to the rear of the chute and are formed with longitudinally extending feet 33 and 34, respectively (FIGS. 2 and 3). The foot portions of the legs are secured to the basin wall 18 of the hopper by nuts and bolts or other suitable fasteners. preferably, the foot portions are formed or provided with longitudinally elongated bolt holes (FIG. 2). In this manner, the chute may be adjusted forwardly or rearwardly at the factory before the fasteners are tightened. Since the rate control device 21 is mounted on the chute, and since the shutter is engaged by the rate control at variable points as it is shifted rearwardly, the rate control device may be standardized and/or calibrated by the manufacturer. This may be accomplished by shifting the chute forwardly or rearwardly until the amount of material dropping onto the impeller in a given amount of time and at various rate control settings is equal to a generally accepted standard amount for each of the settings. Each foot is disposed between one of the guide rails 29 and 30 and one of a pair of laterally spaced apart, leg-positioning ribs 35 and 36 integrally formed in and projecting downwardly from the basin wall. The ribs 35 and 36 are provided on the hopper to insure that the chute is properly aligned in lateral directions relative to the discharge port 17 in the basin wall. By preventing the chute from becoming crooked relative to the discharge port, material is less likely to fall onto a portion of the impeller that will misdirect it from the spreader. It may be noted in FIGS. 2 and 4 that the leading edge of the web 24 spaced below the shutter 19 and port 17 is disposed slightly rearwardly of the forward edge of the discharge port. Owing to this gap and to the angle of the basin wall 18, some material falls freely from the port onto the impeller. In so doing, a larger area of the impeller is covered than would be the case if the chute extended further forwardly. By increasing the target area on the impeller, a wider swath of material is dispensed therefrom.

The web portion of the chute is preferably provided with a pair of longitudinally extending guardrails 37 and 38 spaced inwardly from and generally parallel to the legs 22 and 23, respectively (FIGS. 3 and 5). The longitudinal guardrails limit the amount of fertilizer, grass seed or other material reaching the more lateral portions of the web, thereby narrowing the stream of material flowing from the chute to the impeller. The web is also provided with a transverse rib 39 (FIGS. 4 and 5) that prevents some of the material from backing up into the rate control mechanism 21.

Extending downwardly from a rear section of the web 24 is a housing 40 for the rate control mechanism 21. The housing 40 is open at the bottom, and a portion of the regulator projecting downwardly therefrom is accessible to the operator. The regulator is otherwise protected on four sides by the walls of the housing 40.

The rate control device 21 is preferably a wheel-like structure provided with an axially elongated, central spindle or hub 41, a generally planar rear face 42, and a helically-shaped, shutter-engaging front rim or stop surface 43. An annular, outer surface extending between the helical front rim and the perimeter of the planar rear face is provided with a plurality of relatively shallow, axially extending channels or grooves. The central spindle 41 is rotatably mounted on a bolt extending through a front wall and a rear wall 44 of the housing 40. The radius of the control mechanism is such that the downwardly projecting stop 31 formed on the shutter engages the helically-shaped front rim 43 and prevents the shutter from moving towards a more opened position relative to the discharge port. In effect, the rate control device, particularly the front rim thereof, acts like a cam to control the shutter movement. Alphanumeric symbols or other indicia are arrayed circumferentially on the rear face or dial 42 of the mechanism to identify the various settings in which the regulator may be positioned.

Advantageously, the rear wall 44 of the chute housing 40 is provided with a window 45 (FIG. 3) through which only one symbol at a time is visible. In addition, a spring clip 46 (FIG. 5) or other resilient detent may be mounted on a side wall of the housing and may be biased to frictionally engage the channels or grooves formed in the annular outer surface of the regulator. In this manner, the rate control is held in place until the operator wishes to change the setting.

Operation of a broadcast spreader equipped with the described chute and rate control assembly proceeds in the following manner. First, the operator must determine if the shutter is closed relative to the discharge port. If the spreader is equipped with a shutter shifting assembly disclosed in our previously cited patent application, the shutter is closed by pushing in an actuator knob until it engages a catch mechanism. In any case, the shutter 19 constructed according to the present preferred embodiment is closed when it is in its most forward position (not shown) and completely covers or underlies the discharge port 17.

Next, the hopper is filled with fertilizer, grass seed or other material intended to be distributed onto a lawn or other surface. The exposed portion of the rate control 21 extending downwardly beyond the open end of the chute housing 40 is rotated by hand until a desired symbol, typically a number corresponding to a measured output of material onto a unit area of lawn, appears in the window 45 formed in the rear wall 44 of the housing. The rate control may be adjusted either before or after filling the hopper with material, but should be moved only after closing the shutter. In this manner, the shutter stop 31 is not pressing against the helical front rim 43 of the rate control or impeding the rotation of the control to the relatively low numbered, port-restricting settings.

The operator then positions the spreader at a convenient starting point for the area intended to be covered. He or she begins to push the spreader forwardly and simultaneously shifts the shutter rearwardly by whatever remote mechanism is provided on that particular spreader. The shutter shifting mechanism should be resiliently biased to urge the shutter towards the opened positions so that contact between the helical rim of the rate control and the detent 31 on the shutter is maintained.

With the discharge port thus opened, material falls from said port directly onto the impeller 12, as well as onto the web portion 24 of the chute. Preferably, the web is parallel to the rear basin wall 18 and is inclined downwardly relative to a horizontal plane at an angle within the range of twenty to forty-five degrees (20°-45°). Material thus slides down the web, falling from the forward edge 32 of the chute onto the impeller.

With the operator pushing the spreader over the ground, the rotary impeller is driven by the wheels 13. The centrifugal force generated by the rotating impeller is sufficient to cast the material landing thereon outwardly in a fan-like pattern onto the lawn. The impeller is preferably provided with a plurality of upwardly projecting sectional fins and is sized so that, during the time the material landing on a rear center portion of the impeller is being driven to the perimeter by centrifugal force, the sector containing the material has reached a middle or forward position and thus hurls the material in front of the spreader.

During turns and upon completion of the task, the operator closes the discharge port in a manner previously explained. Once finished, he or she transfers unused material from the hopper to a container or package. The hopper, discharge port, shutter, rate control, chute and impeller are then hosed off, with the rate control setting at its most open or "wash" position, and with the shutter shifted thereto.

Thus it may be seen that the present combined chute and variable rate control assembly provides substantial control over the distribution pattern and flow rate of the material, as well as being fairly easy to operate, durable, and generally well suited for use on relatively inexpensive broadcast spreaders marketed to nonprofessional gardeners.

While a single preferred embodiment of the present invention has been described and illustrated in some detail, the present disclosure is not intended to unduly limit or restrict either the invention or the scope of the following claims.

We claim:

1. In a broadcast spreader for distributing granular or pelletized material, said spreader having a hopper provided with a discharge port, a shutter disposed below said discharge port in close proximity thereto for movement between a closed position and a plurality of open positions, and an impeller spaced below said shutter, that improvement which comprises:

(a) a material-directing chute formed with a pair of laterally spaced apart legs connected to the hopper, a material-directing web portion extending from one leg to the other leg in spaced relation to and between the shutter and the impeller, and an end wall formed with a dial-viewing opening; and (b) variable flow rate regulating means rotatably mounted on the chute and movable selectively between a plurality of settings to releasably engage the shutter and limit opening movement thereof, said flow rate regulating means including a setting-indicating dial disposed in close proximity to the end wall of said chute and having symbols thereon viewable through the dial-viewing opening of said end wall.

* * * * *